Dec. 11, 1962
D. FRIEND
3,067,907
ANTI-SURGE VEHICLE TANK CAP
Filed Oct. 3, 1960
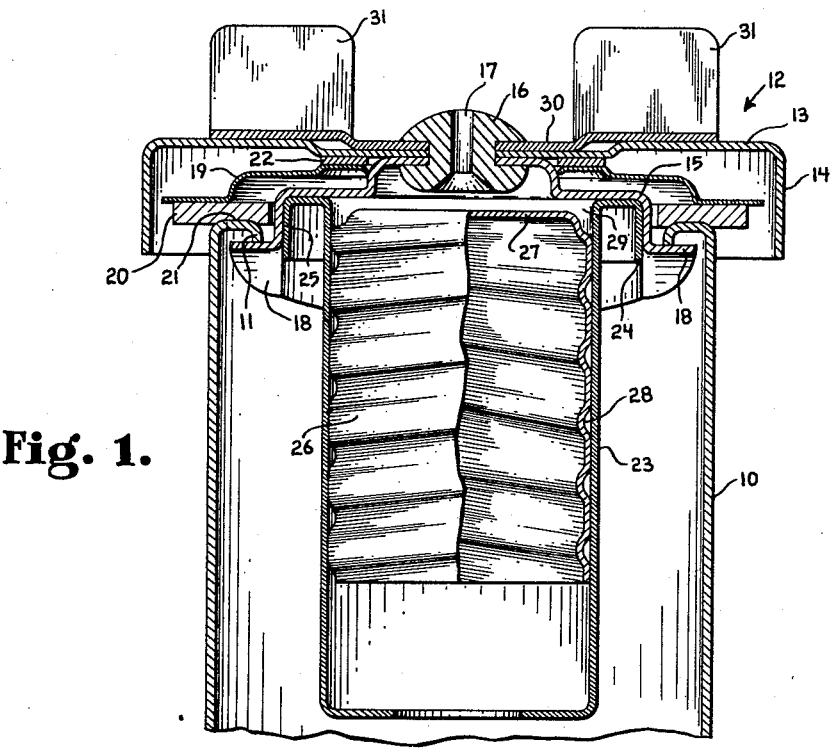
Fig. 1.
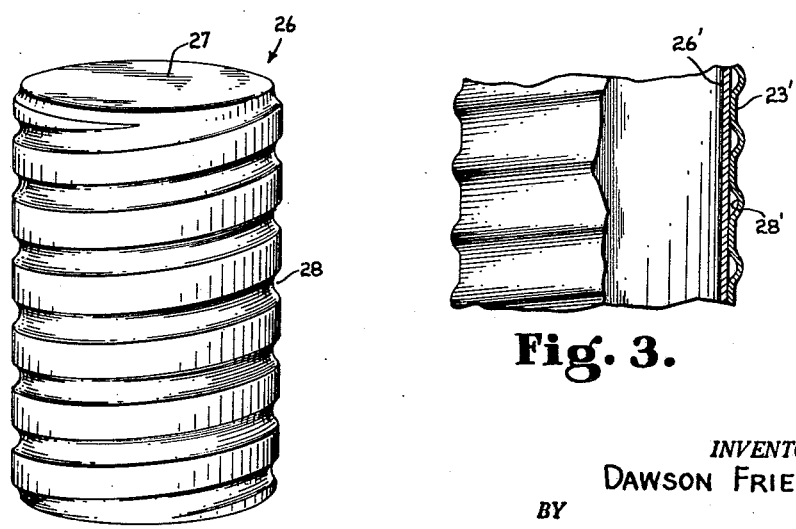
Fig. 2.
Fig. 3.
INVENTOR.
DAWSON FRIEND
BY
Harold B. Hood
Attorney

United States Patent Office 3,067,907
Patented Dec. 11, 1962

3,067,907
ANTI-SURGE VEHICLE TANK CAP
Dawson Friend, Connersville, Ind., assignor to Stant Manufacturing Company, Inc., Connersville, Ind., a corporation of Indiana
Filed Oct. 3, 1960, Ser. No. 60,193
1 Claim. (Cl. 220—44)

The present invention relates to a vented cap for the filler neck of vehicle tanks, the construction being such as to permit such a tank to breathe freely while effectively preventing the escape of liquid therefrom which might otherwise result from centrifugal or inertial forces encountered during travel of a vehicle. While the invention is primarily concerned with closure caps for vehicle fuel tanks, its principle is applicable to other types of liquid tanks including the reservoirs of non-pressure-type vehicle engine cooling systems.

The primary object of the invention is to provide a cap so constructed and designed as to prevent loss of liquid from a fully-vented tank. A further object of the invention is to provide a cap of the character described which shall be extremely inexpensive in construction and may be produced and assembled with minimum labor and expense.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claim is not violated.

FIG. 1 is a vertical section through a conventional filler neck for a tank, showing a cap constructed in accordance with the present invention assembled therewith;

FIG. 2 is a perspective view of a plug structure constituting an important element of the present invention; and FIG. 3 is a fragmentary elevation, partly in section, of a modified form of surge-preventing means.

Referring more particularly to the drawings, it will be seen that I have illustrated at 10 a fragment of the filler neck of a liquid tank, said filler neck being formed with an inwardly and downturned lip 11 which, in accordance with conventional practice, is formed to provide diametrically opposite camming surfaces. A cap constructed in accordance with the present invention is indicated generally by the reference numeral 12 and comprises a discoid body 13 provided with a downturned perimetral flange 14.

A dome shaped shell 15 is concentrically secured to the inner surface of the cap body, within the boundaries of the flange 14, by means of a hollow rivet 16 having a passage or port 17 therethrough. Said shell 15, in accordance with conventional practice, is provided with diametrically-projecting ears 18, 18 arranged for cooperation with the cammed edges of the lip 11 to retain the cap 12 in closing association with the upwardly opening mouth of the filler neck 10. Concentrically sleeved on the upper end of the element 15 is a flexible diaphragm 19 which perimetrally carries a gasket 20 adapted sealingly to seat upon the upwardly-presented surface 21 of the lip 11; and a gasket 22 may preferably be interposed between the central region of the diaphragm 19 and the inner surface of the cap body 13.

A tubular housing 23, open only at its opposite ends, is formed at its upper end with an outwardly and downwardly turned flange 24 which is proportioned and designed to fit snugly within the internal surface 25 of the element 15. Preferably, the housing 23 will be supported from the element 15 by a press fit, though the flange 24 may, if desired, be welded, soldered or otherwise secured to the element 15. Snugly received within the housing 23 is insert plug 26 having at least one imperforate end wall 27. The plug 26 may be formed from inexpensive sheet metal and its length is preferably substantially less than the length of the housing 23. Said plug is fixedly mounted in said housing, preferably by a press fit therein, though it may, if desired, be soldered, welded or otherwise secured in place in said housing.

In the form of my invention illustrated in FIG. 1, the external perimetral surface of the plug 26 is formed to provide a helical channel one end of which is in open communication with the interior of the housing 23 adjacent the lower end of said housing and the other end of which is in open communication with the interior of the housing adjacent the upper end thereof. Thus, the external wall of the plug 26 cooperates with the internal wall of the housing 23 to define a continuous, tortuous channel or passage providing the sole communication between the inner end of the housing 23 and a chamber 29 defined between the end wall 27 of the plug and the interior of the dome shaped element 15. Since that chamber is in open communication with the atmosphere through the port 17 of the rivet 16, gas or vapor may flow freely into or out of the tank with which the cap 12 is associated; but because the channel or passage defined between the plug 17 and the housing 23 is long and tortuous, liquid will not escape therethrough, even under the most radical effects of centrifugal, acceleration or deceleration forces. The chamber 29 defined between the plug end wall 27 and the element 15 acts, of course, as a trap or sump so that, even if any liquid should succeed in traversing the entire length of the tortuous channel, it would have to fill that chamber before it could escape through the port 17.

While I consider the form of my invention illustrated in FIGS. 1 and 2 to be optimum, because the plug 27 may be formed of inexpensive, readily malleable metal, it would be possible to shape the housing 23′ with an internal, continuous groove 28′ and to mount a plug 26′, having ungrooved walls, in such a housing.

While I presently believe that it will be best to form the housing 23 and the plug 26 from sheet metal, it would be possible to use other materials, including molded synthetic materials, for either or both of those elements.

I claim as my invention:

In a device of the class described, a discoid cap body having a down-turned, perimetral flange, a flexible diaphragm coaxially received within said flange with its outer perimetral region axially spaced from said body, a domed shell arranged within said flange, a hollow rivet penetrating said shell and said cap body to secure said shell to said cap body, the central portion of said diaphragm being disposed between said shell and said cap body, a tubular housing open only at its opposite ends, one end of said housing being seated and secured within that end of said shell remote from said cap body, and a hollow plug formed of sheet material snugly and fixedly received within said housing, at least one end of said plug being closed, with the external perimetral wall of said plug in close engagement with the internal perimetral wall of said housing, one of said walls being formed with a continuous, helical groove therein opening at its opposite ends to the interior of said housing at points beyond the opposite ends of said plug.

References Cited in the file of this patent
UNITED STATES PATENTS

| | | |
|---|---|---|
| 1,472,220 | Johnson et al. | Oct. 30, 1923 |
| 2,399,384 | Pross | Apr. 30, 1946 |
| 2,739,731 | Hautzenroeder et al. | Mar. 27, 1956 |
| 2,918,192 | Dedman | Dec. 22, 1959 |